Sept. 21, 1965 T. C. BROCE 3,207,888

ELECTRONIC CIRCUIT FOR COMPLEMENTING BINARY CODED DECIMAL NUMBERS

Filed Nov. 24, 1961

INVENTOR.
THOMAS C. BROCE

BY Otto Schmid, Jr.

AGENT

United States Patent Office 3,207,888

Patented Sept. 21, 1965

3,207,888
ELECTRONIC CIRCUIT FOR COMPLEMENTING BINARY CODED DECIMAL NUMBERS

Thomas C. Broce, San Jose, Calif., assignor to International Business Machines Corporation, New York, N.Y., a corporation of New York Filed Nov. 24, 1961, Ser. No. 154,581
4 Claims. (Cl. 235—174)

The present invention pertains generally to complementing circuitry and relates more particularly to circuits for obtaining the complement of a binary coded decimal number.

In various binary coded systems, decimal digits are represented by four binary signals termed "bits" which bits, reading from right to left, correspond to the values $2^0$, $2^1$, $2^2$, and $2^3$ or representing the decimal digits 1–2–4 and 8 respectively. For example, the binary number 1001 represents a decimal digit 9 which is determined by the addition of decimal digit 1 and 8 indicated by the binary 1 in the extreme right and left binary position respectively.

When utilizing the 8–4–2–1 code, simple binary addition methods may be used. However, since it is desired to maintain the number in binary coded decimal form, problems arise which are not encountered in a pure binary system. One such problem arises in subtraction when it is necessary to use the complement of the binary coded decimal number. According to the prior art, a separate machine cycle was required to convert a binary coded decimal number standing in a register to its complement and it was necessary to recirculate the complement number to enter it into the original register.

The present invention is directed to structure for converting a binary coded decimal number directly to its complement form and is adapted for use with a parallel binary coded decimal computer system. In accordance with the present invention, a single pulse on a control line is entered into a suitable matrix which senses the condition of a register output and switches the bistable elements of the register so that the complement of the binary coded decimal number is generated in the register. Thus, instead of requiring a separate machine operation or the recirculation of the complement form in the manner taught by the prior art, the present invention discloses a means for converting the number directly to the complement form in the original register without the necessity for a separate machine cycle.

Thus, an object of this invention is to provide an improved device for generating the complement of a binary coded decimal number.

Another object of this invention is to provide an improved means for generating the complement of a binary coded decimal number.

A further object of this invention is to provide a circuit for generating the complement of a binary coded decimal number in a register by the use of a matrix controlled by a single control pulse.

Still a further object is to provide a device for generating the complement of a binary coded decimal number without the necessity of recirculating the factors thereto.

Another object is to provide circuits for generating the 9's complement of a parallel binary coded decimal number and for gating signals through a matrix under control of a single control pulse so that signals generated at the output of the matrix change the representation in the register to the complement of the binary coded decimal number.

Other objects of the invention will be pointed out in the following description and claims and illustrated in the accompanying drawings which disclose, by way of example, the principle of the invention and the best mode which has been contemplated of applying that principle.

Before proceeding with the description of the circuitry of the invention it will be well to understand that this circuitry is described as being used in connection with a binary coded decimal arithmetic system. Additionally, it should be understood that the novel circuitry disclosed herein is arranged to convert a binary coded decimal number directly to the 9's complement form.

The following chart indicates the various decimal and binary coded decimal numbers with their 9's complements.

*Table 1*

| Decimal Number | Binary Equiv. | | | | Decimal Complement | Binary Equiv. | | | |
|---|---|---|---|---|---|---|---|---|---|
| | 8 | 4 | 2 | 1 | | 8 | 4 | 2 | 1 |
| 0 | 0 | 0 | 0 | 0 | 9 | 1 | 0 | 0 | 1 |
| 1 | 0 | 0 | 0 | 1 | 8 | 1 | 0 | 0 | 0 |
| 2 | 0 | 0 | 1 | 0 | 7 | 0 | 1 | 1 | 1 |
| 3 | 0 | 0 | 1 | 1 | 6 | 0 | 1 | 1 | 0 |
| 4 | 0 | 1 | 0 | 0 | 5 | 0 | 1 | 0 | 1 |
| 5 | 0 | 1 | 0 | 1 | 4 | 0 | 1 | 0 | 0 |
| 6 | 0 | 1 | 1 | 0 | 3 | 0 | 0 | 1 | 1 |
| 7 | 0 | 1 | 1 | 1 | 2 | 0 | 0 | 1 | 0 |
| 8 | 1 | 0 | 0 | 0 | 1 | 0 | 0 | 0 | 1 |
| 9 | 1 | 0 | 0 | 1 | 0 | 0 | 0 | 0 | 0 |

It is from this chart that the logic for the conversion matrix of the disclosed embodiment of the invention is derived. Referring to the chart, it can be seen that (1) Bit one of the binary coded decimal number is always changed to obtain the complement of the binary coded decimal number.

(2) Bit two of the binary coded decimal number is always the same as bit two of the complement so that bit two is never changed.

(3) When bit two of the binary coded decimal number is one, then bit four of the binary coded decimal number must be changed to obtain the complement of the number.

(4) When bits two and four of the binary coded decimal number are zero then the eight bit of the binary coded decimal number must be changed to obtain the complement of the binary coded decimal number.

Figure 1:
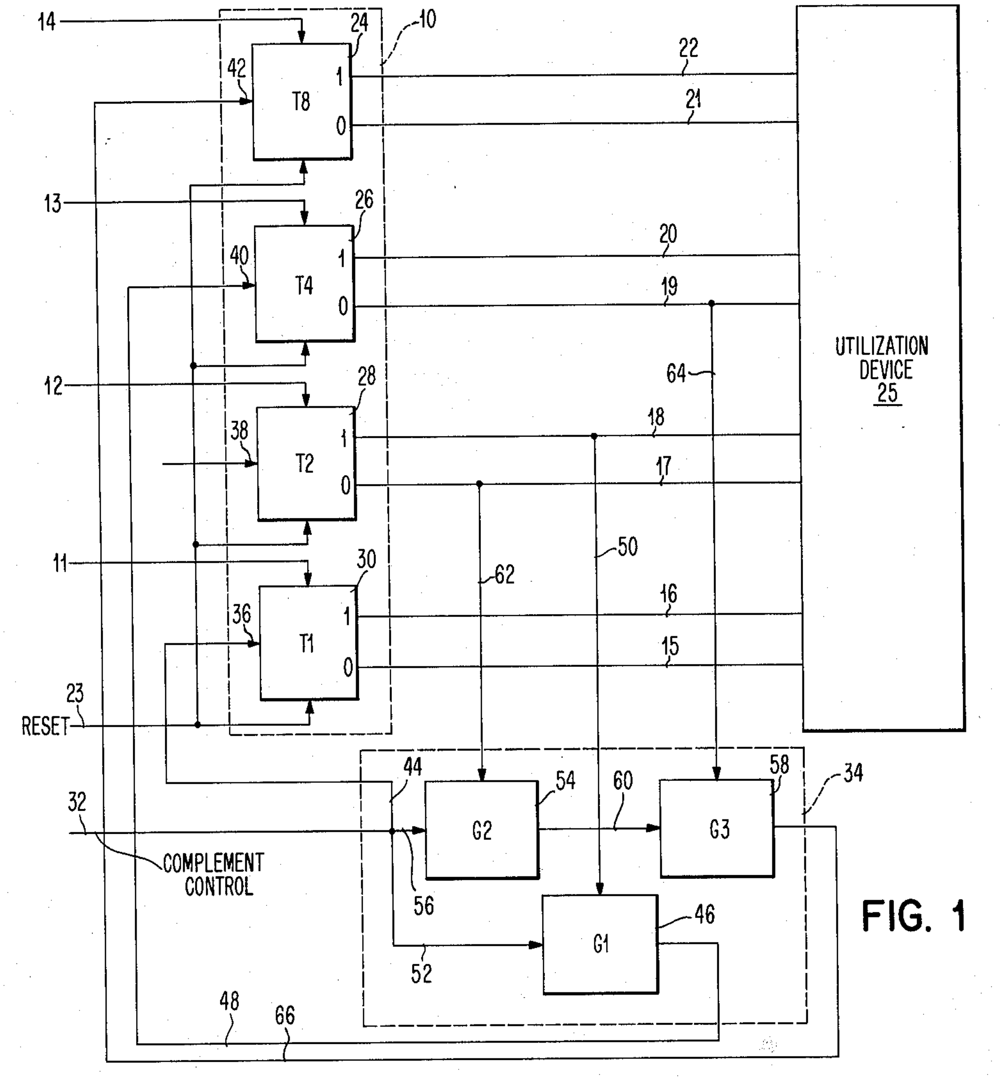
FIG. 1 is a schematic block diagram of one embodiment of the invention.

Referring to FIG. 1 of the drawing, binary coded decimal numbers are entered into a register 10 which is arranged to store the number entered into the register upon lines 11 through 14. Each of the lines 11–14 is connected to a stage of the register, and each stage of the register comprises a bistable device. The bistable devices shown in FIG. 1 comprise triggers 24, 26, 28, 30. Eight lines 15–22 connect to the output of the register to a utilization device 25, and the condition of these lines indicates the number stored in the register. The register 10 is initially reset to zero by a signal on reset line 23 so that all zero bit lines 15, 17, 19, 21 are high. A pulse input on input lines 11–14 will cause the corresponding bistable device to switch state so that the corresponding "1" bit line 16, 18, 20, 22 will be high. Thus, if the number contains a one bit, line 16 is high. Similarly if a number contains a two bit, a four bit or an eight bit the lines 18, 20 and 22 respectively are high. Also, if the number does not contain a two bit, a four bit or an eight bit the lines 17, 19 and 21 respectively are high. Thus, for example, when the number is equal to seven (0–1–1–1) the lines 21, 20, 18 and 16 are high. Each of the triggers 24, 26, 28, 30 is provided with a reversing input 36, 38, 40, 42. A signal to the reversing input causes the trigger to change state.

There is provided a line 32 COMPLEMENT upon which a single pulse is entered when it is desired to obtain the complement of the number in the register. Logic means 34 are provided to sense the condition of the output of the register and to introduce the proper signals to the input of the register to reverse the state of certain of the register stages so that the complement of the number is obtained in the register upon the application of the single pulse to the complement line 32.

It will be recalled that the one bit of the complement of the binary coded decimal number is always changed; for this reason line 32 is connected to the one bit input of the register 10 through a line 44. Thus, a complement input pulse will change the state of the one bit of the number stored in the register. It will also be recalled that the two bit of the complement number is always the same as the two bit of the original number; therefore, no change is made in the two bit of the number stored in the register to obtain the complement.

To obtain the complement of the number, logic means are provided to change the four bit of the number when the two bit is equal to one. In the circuit shown in FIG. 1, this function is performed by gate 46 of logic means 34. Gate 46 is designed to produce an output on line 48 when there is coincidence between an up level on line 50 and a pulse input on line 52. Accordingly, line 32 is connected to one input of gate 46 by line 52. The line 50 connects the register output line 18 to the gate so that the gate senses the condition of the two bit stage of the register. An up level on line 18 will condition gate 46 so that when a pulse is applied on line 32 an up output is generated by gate 46 and passed through line 48 to reversing input 40 of the register which changes the state of the four bit of the number in the register.

Another change that the logic means must perform to obtain the complement form of the number in the register, is that the eight bit must be changed when both the two bit and the four bit are equal to zero. Referring to FIG. 1, the complement input line 32 is connected to one input of a gate 54 through line 56. The gate 54 is conditioned by sensing through line 62 an up output on line 17 which represents a condition of register 10 in which the two bit is zero. The output of gate 54 is connected by line 60 to one input of gate 58. Gate 58 is conditioned by sensing an up level on line 19 which denotes the four bit position in the register stores a zero. This sensing of the conditition of the four bit position of the register is accomplished by the connection of line 64 between gate 58 and line 19. The output of gate 58 is connected by line 66 to reversing input 42 of the register; thus, when a complement input signal is placed on line 32, gate 54 produces an output if the two bit of the number in the register is a zero, and this output from gate 54 produces an output from gate 58 if the four bit of the number in the register is a zero. The output from gate 58 thus goes to the eight bit reversing input of the register thereby changing the eight bit of the number in the register to correspond to that required for the complement of the number.

While the operation of the embodiment shown in FIG. 1 has been explained step by step, it should be understood that the operation is limited only by circuit response time so that the complement of the binary coded decimal number appears in the register substantially simultaneously upon the application of the complement pulse to the complement line since the gates have already been conditioned by sensing the condition of the register.

Thus, it can be seen that the complement of a number can be obtained substantially simultaneously without the necessity of a separate machine cylce and it is not necessary to recirculate the number to get its complement in the original register.

Figure 2:
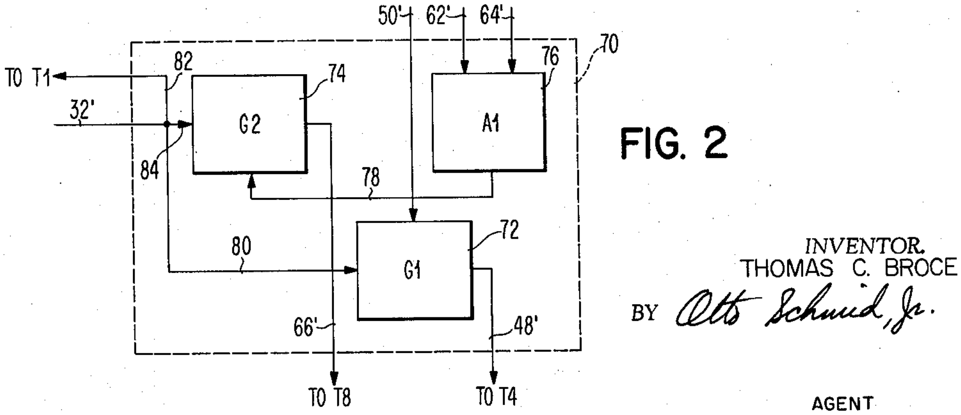
FIG. 2 is a schematic block diagram of an alternate embodiment of the logic means of the invention as set forth in FIG. 1.

The logic means 70 shown in FIG. 2 comprises a first and a second gate 72, 74 and an AND circuit 76 connected to sense the condition of the output lines of the register and produce an output under control of a complement signal which output is applied to the input lines of the register to change the number therein to its complement form.

In the embodiment of the invention shown in FIG. 2, the complement input line 32′ is connected to the one bit input of the register through line 82 so that the one bit of the number is always changed when the complement of the number is desired. Also, the two bit of the number is never changed since it has been seen that the two bit of the number and its complement are the same.

The logic means shown in FIG. 2 to change the four bit of the binary coded decimal number in the register when the complement of the number is desired comprises a gate 72. The complement input line is connected by line 80 to one input of gate 72, whereas the other input of the gate is connected through line 50′ to sense the condition of the two bit of the number in the register. Gate 72 is conditioned by an up level on line 50′ which denotes a one in the two bit position of the register and an output is generated upon coincidence of the up level on line 50′ and an input pulse on the complement input line. This output is coupled by line 30 to the four bit input line 40′ of the register so that the four bit of the number is changed.

The means in the embodiment shown in FIG. 2 for changing the eight bit of the number in the register when both the two bit and the four bit are zeros comprises a gate 74 and an AND circuit 76. The complement input line 32′ is connected to an input of gate 74 through line 84. The gate 74 will produce an output when there is coincidence between an up level on line 78 and a pulse input on line 32′. To obtain an up level on line 78 it is necessary that up levels be present on both lines 62′ and 64′ which will condition AND circuit 76 and thereby produce an up level output on line 78. Up levels on lines 62′ and 64′ sense that a zero is present in the two bit and four bit respectively of the number in the register. The conditioning of gate 74 in combination with the complement input pulse on line 32 produces an output which is coupled by line 66′ to the eight bit position input line 42 of the register. Thus, it can be seen that the eight bit of the number in the register is changed when a complement input pulse is applied to the COMPLEMENT line 32′ and both the two bit and four bit of the number in the register are zeros.

In the description of the alternate embodiment of the logic means shown in FIG. 2, a prime has been added to reference numbers for other components of the system to avoid confusion. The components so numbered are the same as the corresponding components described in connection with FIG. 1.

While there have been shown and described and pointed out the fundamental novel features of the invention as applied to preferred embodiments, it will be understood that various omissions and substitutions and changes in the form and details of the device illustrated and in its operation may be made by those skilled in the art but not departing from the spirit and the scope of the invention. It is the intention therefore to be limited only as indicated by the scope of the following claims.

What is claimed is:

1. A circuit for obtaining the nine's compliment of a binary coded decimal number comprising:

a register having an input and an output;

logic means;

a complement input line;

means for coupling said logic means to said register to sense the condition of the output thereof; and
means for coupling said complement input line to said logic means and to said register;
said logic means responsive to a single pulse on said complement input line to generate an output in accordance with the sensed output of said register which generated output is applied to said register input so that the complement of the binary coded decimal number is generated in said register.

2. A circuit for receiving a series of groups of binary signals respectively representing the decimal number on an 8–4–2–1 basis, said circuit being selectively operable in response to a control signal to produce output signals representing the nine's complement of the number, said circuit comprising a register for simultaneously indicating the orders of the digits of the number, output circuit means responsive to the presence or absence of a bit in the respective orders of the number received by said register, a control signal means, logic means comprising a first gating means responsive to said output circuit means representative of a two bit and a second gating means responsive to said output circuit means representative of the absence of a two bit and a four bit, control signal means, and means for coupling said control signal means to said logic means so that a single pulse from said control signal means is operative to produce an output from said logic means to change the number in the register to its complement form.

3. A circuit for generating a nine's complement of a decimal number in binary coded decimal form comprising four binary digits weighted on an 8–4–2–1 basis comprising a register for simultaneously indicating the various orders of said number, logic means comprising a first and a second gate, a complement input line, means for coupling said complement input line to said first and said second gates and to the one bit position of the said register, means for coupling said first gate to said register to change said four bit position of said register when said two bit position contains a one in coincidence with a signal on said complement input line, and means for coupling said second gate to change said eight bit position of said register when said two bit position and said four bit position of said register contain zeros in coincidence with a signal on said complement input line so that the complement of said binary coded decimal number is generated in said register substantially simultaneously upon the application of a single pulse to the complement input line.

4. A circuit for converting a decimal number in binary coded decimal form into the nine's complement of the number wherein decimal digits are represented by the 8–4–2–1 code comprising a register for simultaneously indicating the various orders of the binary bits of the binary coded decimal number, a control signal line, logic means comprising a first coincidence means conditioned by the presence of a two bit in the binary coded decimal number indicated by said register, a second coincidence means conditioned by the absence of a two bit and a four bit in the binary coded decimal number indicated by said register, means for coupling said logic means to said control signal line to produce an output upon coincidence of the conditioning signal and a single control pulse signal on said control signal line, means for coupling said pulse on said control signal line to change the one bit of the number in the register, means for coupling the output of said first coincidence means to change the four bit of said number in said register, and means for coupling the output of said second coincidence means to change the eight bit of said number in said register whereby the complement of said number in said register is generated in said register substantially simultaneously with the application of a single control pulse on said control signal line.

References Cited by the Examiner

UNITED STATES PATENTS 2,800,276 7/57 Harper ______________ 235—174

MALCOLM A. MORRISON, *Primary Examiner.*